US007478117B1

(12) United States Patent
Lamb et al.

(10) Patent No.: US 7,478,117 B1
(45) Date of Patent: Jan. 13, 2009

(54) RESTORING SYSTEM STATE FROM VOLUME SHADOW COPY SERVICE BY MOUNTING DISKS

(75) Inventors: Jim R. Lamb, Maplewood, MN (US); Shawn L. Elahee, Schertz, TX (US)

(73) Assignee: Symantec Operating Corporation, Mountain View, CA (US)

( * ) Notice: Subject to any disclaimer, the term of this patent is extended or adjusted under 35 U.S.C. 154(b) by 508 days.

(21) Appl. No.: 11/009,108

(22) Filed: Dec. 10, 2004

(51) Int. Cl.
*G06F 17/30* (2006.01)

(52) U.S. Cl. ............... 707/204; 707/203; 707/205; 711/162

(58) Field of Classification Search .............. 707/202
See application file for complete search history.

(56) References Cited

U.S. PATENT DOCUMENTS

| 6,496,944 | B1 * | 12/2002 | Hsiao et al. ............... 714/15 |
| 6,535,998 | B1 | 3/2003 | Cabrera et al. |
| 6,820,214 | B1 | 11/2004 | Cabrera et al. |
| 7,334,157 | B1 | 2/2008 | Graf et al. |
| 2002/0107877 | A1 * | 8/2002 | Whiting et al. ............. 707/204 |
| 2004/0250033 | A1 * | 12/2004 | Prahlad et al. ............. 711/162 |
| 2005/0125460 | A1 | 6/2005 | Yu et al. |

OTHER PUBLICATIONS

"Veritas Backup Exec™ 0.1 for Windows Servers," Intelligent Disaster Recovery™ Option, White Paper, Veritas Software Corp. 2002, pp. 1-9.
"How Volume Shadow Copy ServicesWork," http://www.microsoft.com/technet/prodtechnol/windowsserver2003/library/TechRef/2b0d2457-b7d8-42c3-b6c9-59c145b7765f.mspx, Mar. 28, 2003, (7 pages).
Office Action from U.S. Appl. No. 10/789,901, mailed Mar. 11, 2008.
http://www.melbpc.org/au/pcupdate/2003/2003article8.html
Reprinted from the Mar. 2000 issue of PC Update, the magazine of Melbourne PC User Group, Australia.

* cited by examiner

*Primary Examiner*—Cam Y T Truong
(74) *Attorney, Agent, or Firm*—Lawrence J. Merkel; Meyertons, Hood, Kivlin, Kowert & Goetzel, P.C.

(57) ABSTRACT

In some embodiments, during a restore operation, a restore program executes in a restore environment on the restore system. The restore program may create a client environment to which a backed up client may be restored, which may include one or more client volumes. The restore program may create a directory structure to restore shadow copy component files, and may mount one or more of the client volumes to the directory structure. The shadow copy component files may be restored to the restore volume(s), and the files restored to directories that are beneath a mount point in the directory structure are restored, through the mount, to the client volume(s).

16 Claims, 9 Drawing Sheets

Client Config 38

⋮

| | |
|---|---|
| Original System Root | <Drive Letter>:\<Pathname> |
| System Volume GUID | <GUID> |
| Active Directory Sysvol GUID | <GUID> |
| Active Directory Database Path | <Drive Letter>:\<Pathname> |
| Active Directory Log File Path | <Drive Letter>:\<Pathname> |

⋮

| | |
|---|---|
| <Root>/Cluster/ClustDB | Cluster |
| <Root>/SYSTEM32/CONFIG | Registry |
| <Root>/SYSTEM32/Registration | COM+ Class Registration Database |

Fig. 6

```
C:\BMR\SCC\
    Event Logs\
        C\ <EventLogMount>
            WINDOWS\
                SYSTEM32\
                    CONFIG\
    Windows Management Instrumentation\
        C\ <WMIMount>
            WINDOWS\
                Windows Management Instrumentation\
    COM+ Class Registration Database\
    Registry\
    System Files\
        C\ <SystemFilesMount>
            Program Files\
            WINDOWS\
    Internet Information Services\
        C\ <IISMount>
            WINDOWS\
                Internet Information Services\
    Active Directory Sysvol\
        D\ <ActiveDirectoryMount>
            WINDOWS\
                NTDS\
```

Fig. 8

RESTORING SYSTEM STATE FROM VOLUME SHADOW COPY SERVICE BY MOUNTING DISKS

BACKGROUND

1. Field of the Invention

This invention is related to the field of backup and restore of computer systems.

2. Description of the Related Art

Making comprehensive backups of computer system data is an integral part of safeguarding the data against a variety of failure events. Failure events may include a variety of failures, such as hardware failure leading to loss or corruption of the data, software failure leading to loss or corruption of the data, intentional destruction or corruption of data by malicious software such as viruses, environmental events such as electrical power failure, fire, etc. Periodically and reliably backing up the computer system data may thus be critical to the ability to recover from various failure events. Computer system data may comprise a set of files which store the instructions executed by the computer system (e.g. various application programs, operating system software, etc.) as well as related data such as configuration data and the data operated upon by the instructions during execution. Application programs will be more briefly referred to as applications, and operating system software will be more briefly referred to as the operating system or OS.

Some computer system data may be readily backed up. For example, some applications may be stopped, at least temporarily, to permit backup. Since the application is stopped, the files storing the application and the files used by the application are "closed" and thus the state of the files on the storage subsystem of the computer system is consistent and available for copying in the backup operation. However, other computer system data is more problematic. The backup software that performs the backup operation generally executes on the OS, and thus the OS is running during the backup operation. The OS may have at least some files "open" at the time the backup operation occurs. Additionally, for some applications, the performance loss incurred by stopping the application for backup and restarting the application is too large to be acceptable. Such applications remain in operation during backup operation, and may have various files open. A file is "closed" if no software is currently accessing (or able to access) the file. Thus, a closed file has a consistent state in the storage subsystem (e.g. on one or more volumes on one or more disk drives). A file is "open" if software is currently accessing the file or is able to access the file contents using a "handle" assigned to the file by the operating system when the software first accessed the file. An open file may have at least a portion of the file contents copied to memory, and updates to the file may be stored in memory as well (i.e. not yet committed to disk).

In the past, backup software implemented various open file managers to attempt to gather a consistent state of open files for backup. Open file management is complex. For example, gathering a consistent state for multiple files corresponding to a running application is difficult, as one file may be changed before the state is gathered and a corresponding change to another file may occur after the state is gathered. Additionally, as new features are added to the OS and/or applications, the mechanisms for gathering consistent state (and the identification of open files) may change. Thus, the open file managers are subject to frequent update.

Some OSs provide a mechanism to aid the backup process. For example, some OSs implement a service to provide consistent file state for backup. If the OS adds new features (typically creating new files), the service is changed to properly capture the file state for the new features. Backup software interacts with the service to capture the state of open files. Various versions of the Windows® operating system from Microsoft Corporation (Redmond, Wash.) implement such a service, named the Volume Shadow Copy Service (VSS). For example, Microsoft Windows Server™ 2003 and Windows XP implement VSS, and future releases are expected to implement VSS as well.

FIG. 1 is a block diagram illustrating the Volume Shadow Copy Service (VSS) 10 and various other computer system components that interact with the VSS 10. For example, one or more writers 12 are shown. The writers 12 are part of applications or operating system services that are designed to interact with the VSS 10. A requestor 14 is also shown. The requestor 14 interacts with the VSS 10 to obtain consistent sets of file data corresponding to the writers 12, shadow copies of volumes in a consistent state for backup, etc. Additionally, a set of providers 16A-16C are shown. The providers 16A-16C create and maintain volumes and shadow copies of volumes on the storage devices (e.g. disk drives) in the computer system. For example, volumes 18A-18C are shown corresponding to the providers 16A-16C, respectively. The system provider 16A is a default provider that is used if other providers are not included. The hardware provider 16B is part of the storage system hardware and is designed to create shadow copies in response to requests from the VSS 10. The software provider 16C is part of the OS or another application that provides the shadow copy functionality. One or more of any of the providers 16A-16C are included in a given system. The arrows between the VSS 10, the writers 12, the requestor 14, and the providers 16A-16C generally represent application program interfaces (APIs) used to communicate therebetween.

A backup operation generally includes the requestor 14 requesting that the VSS 10 enumerate the writers 12 and prepare for shadow copy creation. The writers 12 respond to the VSS 10 by describing the files that are to be backed up and also by describing the method to be used for restoring the files. In some cases, the files are not directly written back to their original location. For example, some files are placed in a temporary location, and a registry entry is created to restore the file to its proper location on reboot. The description of the files and/or restore methods is provided to the requestor 14 (e.g. as an extensible markup language (XML) document). The files are grouped into groups that are to be backed up as a unit. Each group of files identified by a writer 12 is referred to as a "shadow copy component". The writers 12 prepare their shadow copy components for backup (e.g. flushing writes from memory to disk, completing open transactions, rolling transaction logs, flushing caches, etc.). The VSS 10 requests that the writers 12 quiesce briefly while a shadow copy is created, and freezes the file system. The VSS 10 then requests that the providers 16A-16C make a shadow copy of the volumes, and then permits the writers 12 to continue operation with the original volume copy. The requestor 14 then makes a backup from the shadow copy.

During a subsequent restore of a backup copy, the backup program follows the restore description in the XML document provided from the VSS 10 during the backup operation for the shadow copy components. While such a restore is performed when the backup program is executing in the client that was backed up, other types of backup/restore mechanisms may not perform the restore in this fashion. For example, the Bare Metal Restore™ (BMR) product from VERITAS™ Software Corporation (Mountain View, Calif.)

is designed to restore a client to a different computer system from the one on which the backup was performed (or on the same computer system, but prior to installation of the client's OS). For clients running the Windows® OS, BMR executes on the computer system to which the restore is performed, in a restore environment used for the restore only. The client's computer system data is restored to a client environment. After the restore is complete, BMR updates the boot configuration to boot the client environment and reboots the computer system. After the reboot, BMR and its restore environment are deleted. For such restores, following the restore instructions from the XML document for shadow copy component is complicated by the fact that the restore is occurring in a different environment than the client in which the data is to be restored. For UNIX clients, BMR typically boots the OS over a network, creates volumes on the client disks, mounts the volumes under the booted OS's directory structure, and restores the client files through the mount.

SUMMARY

In some embodiments, during a restore operation, a restore program executes in a restore environment on the restore system (to which the restore operation is being performed). The restore program may create a client environment to which a backed up client may be restored. The client environment may include one or more client volumes. The restore program may create a directory structure in the restore environment to restore shadow copy component files, and may mount one or more of the client volumes to the directory structure. The shadow copy component files may be restored to the directory structure, and the files restored to directories that are beneath a mount point in the directory structure are restored, through the mount, to the client volume(s). In some embodiments, the pathname on the client volume(s) for some shadow copy component files is not retained. The restore program may reconstruct the pathname and may move the files from the directory structure in the restore environment to the correct location on the client volume(s).

In some embodiments, a method is contemplated. The method may comprise creating a directory structure; creating at least one client volume corresponding to a client to be restored by the restore program; mounting the client volume to a directory in the directory structure; and restoring a plurality of files to the directory structure from a backup image corresponding to the client. At least a first file of the plurality of files is restored to the client volume through the directory to which the client volume is mounted. The plurality of files are created by an operating system service during a backup operation that created the backup image. The operating system service is defined to create shadow copies of files that are open during the backup operation. A computer accessible medium storing a plurality of instructions which, when executed, implement the method is also contemplated. A system including a backup server, a restore server, and a restore system is also contemplated.

BRIEF DESCRIPTION OF THE DRAWINGS

The following detailed description makes reference to the accompanying drawings, which are now briefly described.

FIG. 6 is a block diagram illustrating one embodiment of a client configuration and corresponding directories.

FIG. 8 is a block diagram illustrating one embodiment of a directory structure in a restore volume with mount points for client volumes.

Figure 1:
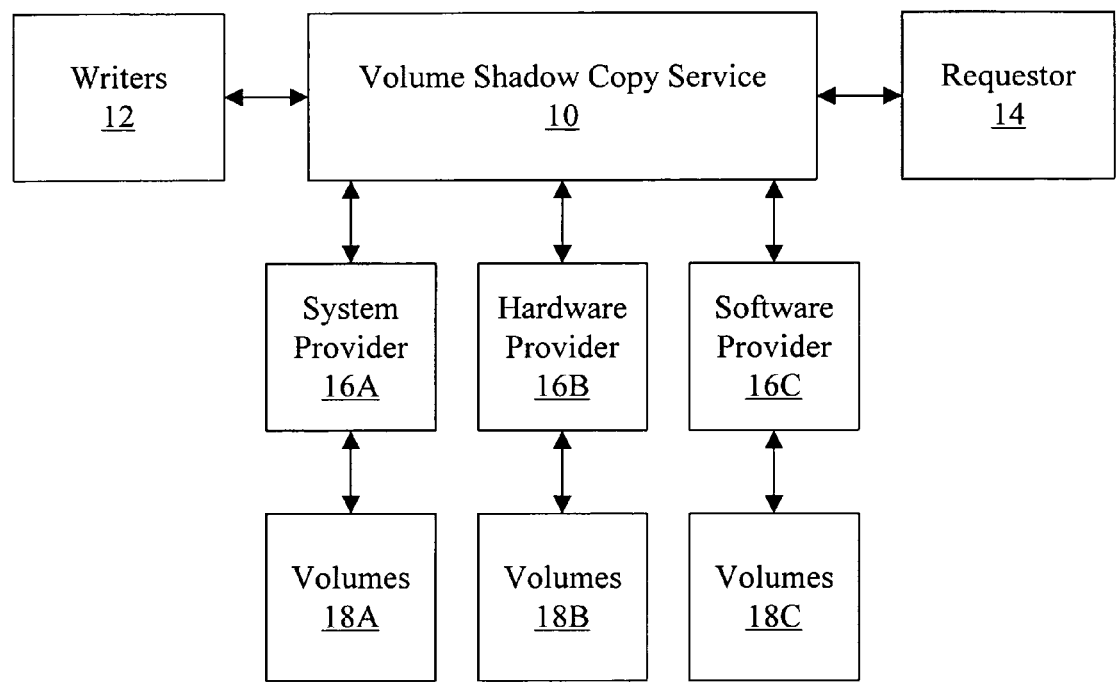
FIG. 1 is a block diagram illustrating a volume shadow copy service.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Figure 2:
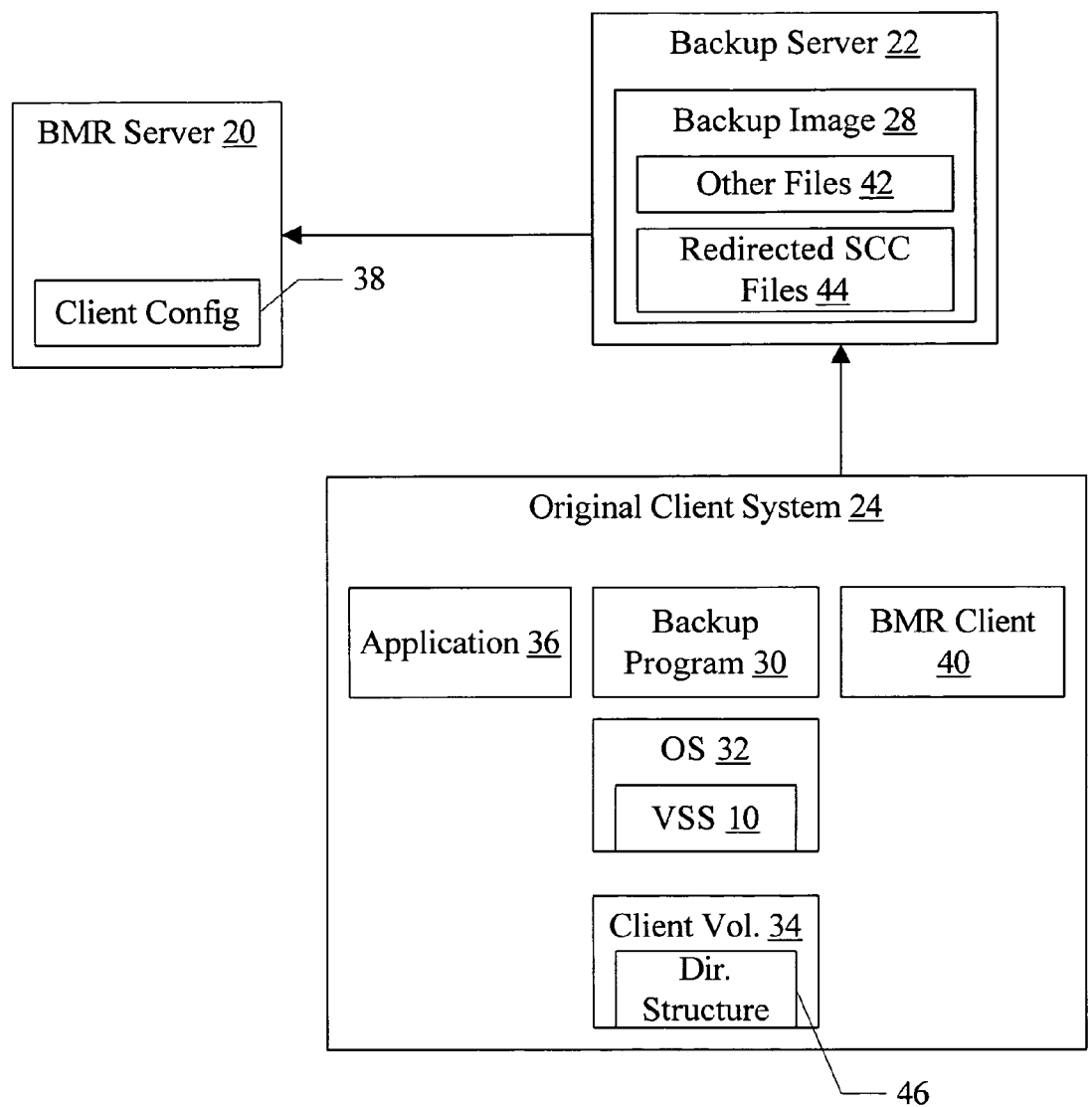
FIG. 2 is a block diagram of one embodiment a system including a bare metal restore (BMR) server, a backup server, and an original client.
Figure 4:
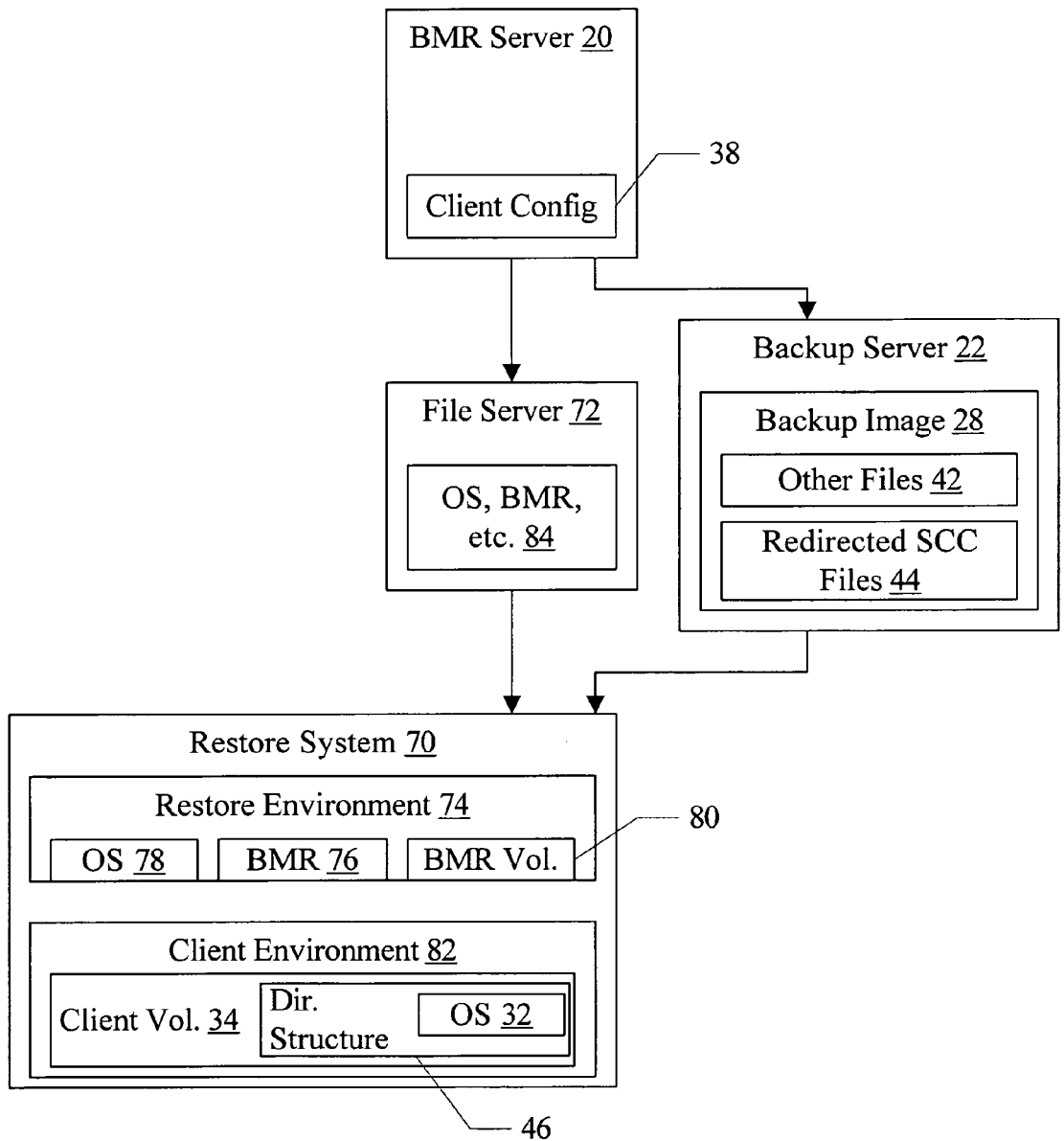
FIG. 4 is a block diagram of one embodiment a system including a bare metal restore (BMR) server, a backup server, a file server, and a restore client.

Turning now to FIG. 2, a block diagram of one embodiment of a system comprising several servers and a client system is shown. The system shown in FIG. 2 may include the portions used to backup an original client system 24. FIG. 4, described below, illustrates one embodiment of the system during restore of the client to a restore system (which may or may not be the same physical computer system as the original client system 24). In the illustrated embodiment, a BMR server 20, a backup server 22, and the original client system 24 are shown. The BMR server 20 is coupled to the backup server 22, and thus is coupled through the backup server 22 to the original client system 24. The BMR server 20 may also be coupled directly to the client system 24, in some embodiments. The original client system 24 is coupled to the backup server 22. FIG. 2 is illustrative of logical relationships between the servers and client. Physical connection may be established in any desired fashion (e.g. any type of network, combinations of networks, shared memory, etc.).

The original client system 24 comprises a computer system on which a client is installed. The client may be backed up using the servers 20 and 22. The client is described separate from the computer system on which it runs, since the client may be restored to a different computer system than the computer system from which it is backed up. Thus, the client may comprise the computer system data (software files, configuration files, and data files) on the computer system, that is backed up from the computer system and may be restored to the computer system. Additionally, the client may comprise the configuration of the computer system (e.g. volume configuration on the storage devices in the computer system). The client is backed up in a backup image 28 on the backup server 22. The backup server 22 may implement any backup solution (e.g. the VERITAS NetBackup™ product from VERITAS™ Software Corporation, or any other VERITAS™ backup product or backup product from any other vendor).

The backup solution may include a backup program 30 that executes on the client system 24 during the backup operation.

The backup program 30 may interface with the VSS 10 in the OS 32 executing on the client system 24. That is, the backup program may be a requestor 14 (see FIG. 1). For non-shadow copy component files or shadow copy component files that are restored to their original locations (as indicated in the restore method description provided from the VSS 10), the backup program 30 may retain the directory structure 46 used in the client for storing the files in the backup image 28 and the files may be restored to their original locations on the client volumes during a restore operation. In some embodiments, the backup program 30 may implement redirection for shadow copy components that are not restored to their original locations (as indicated in the restore method description provided from the VSS 10). The files are redirected in the backup image to a different directory in the backup image 28, which may be used in the BMR restore process to restore the files to their correct locations within the client. More details of the restore process are provided below. Accordingly, the backup image 28 may include the redirected shadow copy component files 44 and the other files 42, as shown in FIG. 2.

Some redirected shadow copy components may retain the directory information indicating where the shadow copy component files are stored in the client. For example, each shadow copy component file in the backup image may be preceded by a header having the full pathname for the file. The backup program 30 may also retain the drive letter that starts the pathname for use with mounting the client volumes during restore, as described in more detail below. Other shadow copy components may not retain the directory information.

In one particular example, the redirected shadow copy components include system files (e.g. application files typically stored in the Program Files\ directory and OS files typically stored in the WINDOWS\ or WINNT\ directory), Windows Management Instrumentation (WMI) files, the OS's event logs, Internet Information Services (IIS) files, Component Object Model (COM+) registration database file, the registry files, cluster database files, and Active Directory® system volume (sysvol) files, database, and log files. Of these, the pathnames are retained in the shadow copy components except for the COM+ registration database file, the registry, the cluster database files, and the Active Directory® database and log files. The Windows Management Instrumentation service may be an implementation of a web-based enterprise management system. The Internet Information Service may be an operating system service providing web server services. The component object model is the software object model implemented in the Windows® operating systems. The Active Directory® is a distributed directory service for distributed computing environments.

The backup program 30 may transmit the contents of the one or more client volumes 34 to the backup server 22 for inclusion in the backup image 28. More particularly, in one embodiment, the contents of the client volumes 34 may be read from a shadow copy of the volumes created via the VSS 10. It is noted that the OS 32 and the VSS 10 are included in files stored on the client volumes 34 as well, but are also shown separately in FIG. 2 to illustrate that they are in execution when the backup program 30 is in execution. That is, the OS 32, the VSS 10, and the backup program 30 (or at least portions of the preceding) are stored in memory and being executed by the processor or processors in the original client system 24. Similarly, in some cases one or more applications (e.g. the application 36 in FIG. 2) may be in execution when the backup program is executing. However, the application 36 is also stored in files on the client volumes 34. Shadow copy components may be identified for the application 36 and/or the OS 32, in various embodiments.

At the time the backup is performed, a record is made of the system configuration. The record is illustrated as the client configuration file 38 on the BMR server 20 in FIG. 2, although the record may be stored in any form. In some embodiments, the client configuration file 38 may be part of the backup image 28 as well, or the client configuration file 38 may be stored only as part of the backup image 28 and may be retrieved by the BMR server 20 when a client restore is to be performed. The record may be created by BMR software (e.g. the BMR client software 40 executing on the client system 24, or the server software on the BMR server 20).

The client configuration file 38 stores various information describing the client system configuration. For example, the system configuration may include the number, type, and size of storage devices in the client system. The system configuration may further include an identification of the volumes on the storage devices, including the layout of volumes on the storage devices and the attributes of the volumes. Other system configuration data may include the number and type of processors, the amount of memory, and information on other peripheral devices such as network interface hardware, printer hardware, user interface devices, etc. Still further, the client configuration file 38 may store certain other configuration information used during the restore process to store redirected shadow copy components, as described in more detail below.

In one embodiment, each of the BMR server 20 and the backup server 22 comprise computer systems configured to execute the corresponding server software. In some embodiments, the servers may be combined onto the same physical computer system, as desired.

As used herein, the term "volume" may refer to any defined amount of storage on one or more storage devices. The term volume may include, for example, logical volume as used in Unix-like operating systems such as Linux, AIX from IBM Corp., Solaris from Sun Microsystems, etc. The term volume may also include, for example, a volume and/or a volume set as defined by various volume manager software such as VERITAS Volume Manager™ from VERITAS Software Corporation. The term volume may further include a partition as used, e.g., in the Microsoft Windows™ and/or disk operating system (DOS) operating systems. A partition may be a division of storage on a single disk drive, isolating the partitioned storage from other storage on the disk drive. Partitions may be primary or extended. The term volume may further refer to volume groups.

As used herein, a storage device may include any sort of computer storage media such as, for example, fixed or removable disk drives, external disk drives (including solid state drives that comprise non-volatile memory such as Flash memory) coupled via a peripheral interface, tape drives, etc.

The backup image 28 may be any representation of the client data. The backup image may be arranged in any desired fashion (that is, the arrangement may differ from the arrangement of data on the client volumes 34). For the other files 42, the location of the files on the client volumes 34 is retained (e.g. pathname within the directory structure 46), so that the files may be restored to the client volumes 34 during a restore operation. Some redirected shadow copy components files 44 may also have the corresponding location retained, as mentioned above.

It is noted that, while a backup image 28 and a client configuration file 38 are illustrated in FIG. 2, the backup server 22 may store multiple backup images 28 and the BMR server 20 may store multiple client configuration files 38.

Various backup images and client configuration files may correspond to different clients (not shown). Also, in some embodiments, various backup images and client configuration files may correspond to different points in time for the same client.

It is noted that, while the Windows® OS is used as an example of an OS in the present description, other embodiments may use any desired OS (e.g. Unix-like OSs such as Solaris from Sun Microsystems, Inc. (Santa Clara, Calif.), AIX from IBM Corporation (Armonk, N.Y.), HP-UX from Hewlett Packard (Palo Alto, Calif.), Linux, etc.; OSs used in the Macintosh line of computers from Apple (Cupertino, Calif.); etc.).

Figure 3:
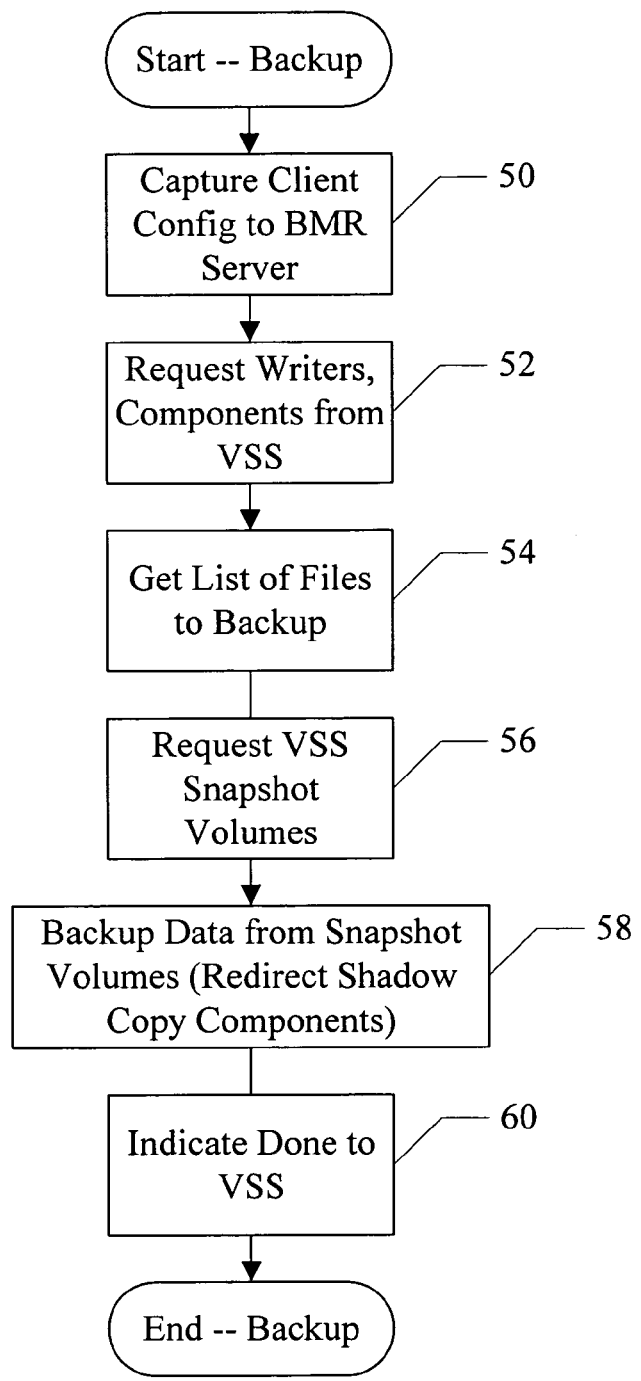
FIG. 3 is a flowchart illustrating one embodiment of a backup operation.

Turning now to FIG. 3, a flowchart is shown illustrating one embodiment of a backup operation for the system shown in FIG. 2. Various operations in FIG. 3 may be described as performed by various software shown in FIG. 2 (e.g. the backup program 30, the BMR client 40, etc.). The identified software may include instructions which, when executed, implement the operation described for that software.

The BMR client 40 may capture the current client configuration information to the BMR server 20 (e.g. as the client configuration file 38) (block 50). The backup program 30 may request that the VSS 10 enumerate the writers 12 and shadow copy components corresponding to those writers 12 (block 52). The backup program 30 may receive the list of files to be backed up from the VSS 10 (block 54). The list of files may include the shadow copy components and other files comprising the client. Based on the list of files, the backup program 30 may determine which volumes to back up and may request that the VSS 10 snapshot the volumes that contain the files (block 56). That is, the backup program 30 may request that shadow copies of the volumes be created. The backup program 30 may backup the data from the snapshot volumes (block 58). Particularly, the files that comprise shadow copy components may be redirected in the backup image 28 to the directory holding shadow copy components. Once the files have been backed up, the backup program 30 may inform the VSS 10 that the backup is complete and the shadow copies of the volumes may be deleted (block 60).

Turning now to FIG. 4, a block diagram of one embodiment of a system comprising several servers and a client system is shown. The system shown in FIG. 4 may include the portions used to restore a client to a restore system 70. In the illustrated embodiment, the BMR server 20 and the backup server 22 are shown, with the backup server 22 storing the backup image 28 corresponding to the client and the BMR server 20 storing the client configuration file 38 corresponding to the client. Also shown in FIG. 4 is a file server 72. The BMR server 20 is coupled to the backup server 22 and the file server 72. The BMR server 20 may also be coupled directly to the restore system 70, in some embodiments. The restore system 70 is coupled to the backup server 22 and the file server 72. FIG. 4 is illustrative of logical relationships between the servers and the restore system. Physical connection may be established in any desired fashion (e.g. any type of network, combinations of networks, shared memory, etc.).

The restore system 70 comprises a computer system to which the client may be restored using the servers 20, 22, and 72. As mentioned previously, the restore system 70 may or may not be the same computer system as the original client system 24.

The restore operation for the present embodiment is performed to a "bare metal" computer system. That is, at the beginning of the restore operation, the restore system 70 may have no software installed on it. As part of the restore operation, a restore environment 74 is created within which the BMR restore program 76 is executed. The restore environment 74 may include an OS 78 on which the BMR restore program 76 is executed and one or more BMR volumes 80 on which the OS 78 and BMR restore program 76 are stored and on which other data may be stored. A client environment 82 is also created that includes the client volumes 34 (as specified in the client configuration file 38 corresponding to the client). The data from the backup image 28 may be restored to the client volumes 34 (into the directory structure 46, recreated from the backup image 20 also). The OS 32 is shown as part of the client environment 82. For shadow copy components that are part of the OS 32, the components are to be restored into the OS 32. However, the OS 78 is executing during the restore operation. Accordingly, just following the restore method for a shadow copy component (e.g. restore to a temporary file and update the registry for file move on reboot) may not lead to a correct restore into the OS 32.

In the present embodiment, the restore environment 74 is provided for performing the restore operation only, and the restore environment 74 and its contents are deleted once the restore operation is complete and the restore system 70 is rebooted into the client environment 82. The OS 78 need not be the same version of the operation system software as the OS 32, for example.

Generally, the BMR restore program 76 is configured to restore the data from the backup image 28 to the client volumes 34. For the files 42, the files may be restored to their original locations within the directory structure 46. With respect to the redirected shadow copy component files 44, the BMR restore program 76 may create a directory structure on one of the BMR volumes 80 based on the structure to which the shadow copy components were redirected in the backup image 28. The drive letter from the pathname to each shadow copy component file on the original client system may be a directory in the directory structure, for those shadow copy components for which the pathname is retained. The BMR restore program 76 may configure the drive letter directories on the BMR volumes 80 as mount points, and may mount the corresponding volumes from the client volumes 34 to the mount points. The BMR restore program 76 may then restore the shadow copy components to the directory structure on the BMR volumes 80. The files that are restored below a mount point in the directory structure are thus restored to the correct locations on the client volumes 34 through the mounts.

As mentioned previously, the full pathname for some of the redirected shadow copy component files 44 is not maintained. The client configuration file 38 may retain at least a portion of the pathname, and the BMR restore program 76 may reconstruct the pathnames using the client configuration file information and move the files after the restore has occurred to the BMR volumes 80. Particularly, the full pathname for such files may include the original system root directory, as well as various subdirectories having fairly standard names that BMR may recreate.

As used herein, a directory structure may comprise any set of directories along links therebetween to permit navigation between the directories. For example, a tree structure is often implemented in which directories are included in a hierarchical tree. A directory that is a mount point may be a directory which has been defined as a location to which a volume may be mounted. Any directories underneath the mount point directory in the directory structure ("subdirectories") are actually directories on the mounted volume. Reads and writes to the mount point directory occur at the root of the mounted volume, and reads and writes to subdirectories of the mount point occur in corresponding subdirectories of the root of the mounted volume.

The file server 24 may provide the restore system 70 with various software (reference numeral 84) used during the restore process, which may include the OS 78, BMR restore program 76, backup client software, etc. The file server 24 may implement any file system usable over a network (e.g. network file system (NFS), Server Message Block (SMB) for Microsoft Windows® or Session Message Block (SAMBA) for Unix-like implementations, etc.). When the restore system 70 is booted to perform a restore, the restore system 70 may be booted from a removable media inserted into the restore system 70 and may install the restore environment 74, at least in part, from the file server 24. In other embodiments, the media inserted into the restore system 70 may contain the restore environment 74 and the file server 72 may be eliminated.

While the embodiment illustrated in FIG. 4 shows separate BMR volume(s) 80 and client volume(s) 34, other embodiments are contemplated in which the restore environment 74 and the client environment 82 share a volume or volumes. In such an embodiment, the directory structure used in the restore environment 74 may still be separate from the directory structure 46, and the shared volume(s) may be mounted into the directory structure used in the restore environment 74 to restore the redirected shadow copy component files as described above.

Figure 5:
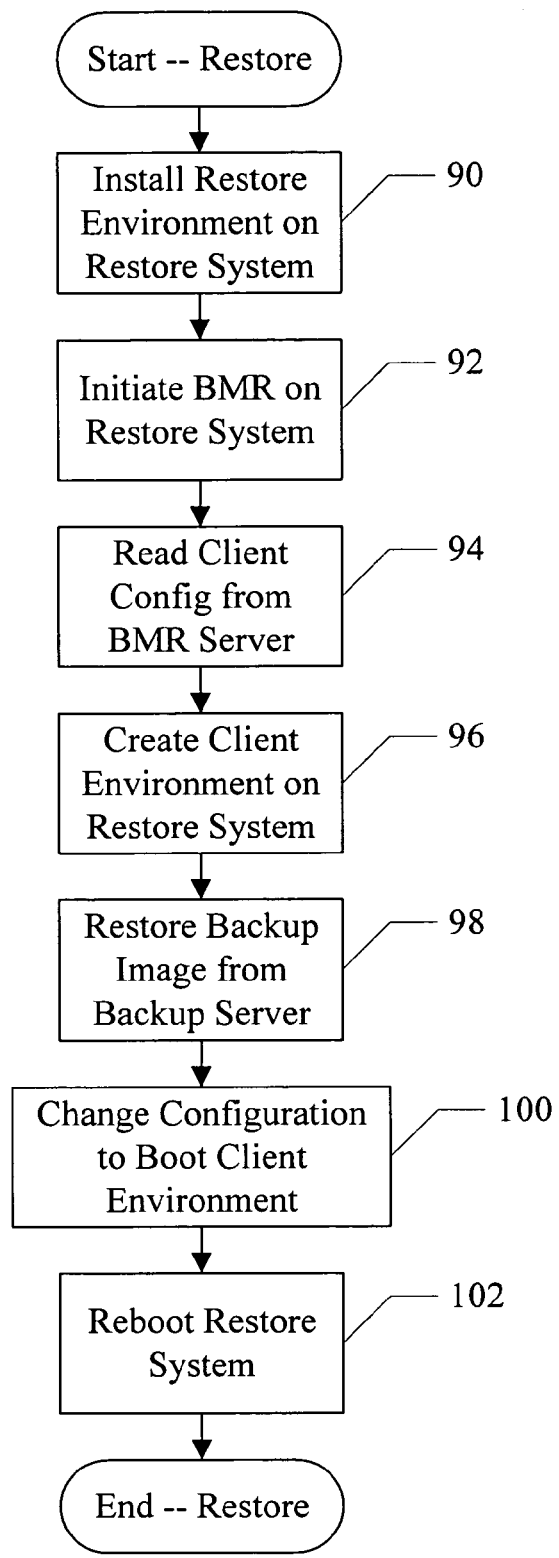
FIG. 5 is a flowchart illustrating one embodiment of a restore operation.

Turning now to FIG. 5, a flowchart is shown illustrating one embodiment of a restore operation for the system shown in FIG. 4. Various operations in FIG. 5 may be described as performed by various software shown in FIG. 4 (e.g. the BMR restore program 76). The identified software may include instructions which, when executed, implement the operation described for that software.

The restore operation may begin by installing the restore environment 74 on the restore system 70 (block 90). Installing the restore environment 74 may include creating the BMR volumes 80 (if applicable), installing the OS 78, and installing the BMR restore program 76. The BMR restore program 76 may be initiated on the restore system 70 (in the restore environment 74—block 92). The BMR restore program 76 may read the client configuration file 38 from the BMR server 20 (block 94) and create the client environment 82 on the restore system 70 (block 96). Particularly, the client configuration file 38 may include a description of the client volumes 34, and the BMR restore program 76 may create the client volumes 34 on the restore system 70. The BMR restore program 76 may restore the backup image 28 from the backup server 22 (block 98). For files other than the shadow copy components (e.g. the "other files" 42 in FIG. 4), the BMR restore program 76 may restore the files from the backup image 28 directly to the corresponding locations in the client environment 82 (e.g. within the directory structure 46). For the redirected shadow copy component files 44, the mounts and file movement may be used as described above. Additional details are also provided below with regard to FIG. 7. The BMR restore program 76 may change the configuration of the restore system 70 to boot the client environment 82 (e.g. boot the OS 32 instead of the OS 78) (block 100). The manner in which the configuration is changed may vary from system to system and from OS to OS. In Windows® OSs, the boot.ini file may be changed. The BMR restore program 76 may then reboot the restore system 70, which may cause the client to be booted on the restore system 70 (block 102).

FIG. 6 is a block diagram of one embodiment of a portion of the client configuration file 38. The portion shown in FIG. 6 includes information captured for use in creating the mounts to the directory structure on the BMR volumes 80 to restore the shadow copy components.

The client configuration file 38 may store the original system root directory (that is, the root directory of the operating system files). The original system root directory may be indicated by a drive letter assigned to the volume on which the operating system files are stored followed by the directory path to the system root directory. In many Windows® systems, the system root directory will be C:\WINDOWS or C:\WINNT. However, other drive letters may be used and the pathname may include one or more other directories in the directory tree, often ending with WINDOWS\ or WINNT\.

Each volume is assigned a globally unique identifier (GUID), and Windows® systems use the GUID to mount volumes. Accordingly, the system volume (storing the operating system files) GUID is stored in the client configuration file 38. Also, if Active Directory® is being used in the client, the Active Directory® sysvol GUID may be stored in the client configuration file 38. Additionally related to the Active Directory® are paths for the Active Directory® database and log files.

As mentioned previously, the pathname information is not retained in the shadow copy components for the COM+ registration database file, the registry, the cluster database files, and the Active Directory® database and log files, in the present example of shadow copy components. The pathnames for the Active Directory® database and log files are retained in the client configuration file 38, and thus may be used for file movement. The pathnames for the COM+ registration database file, the registry, the cluster database files may be reconstructed as standard subdirectories of the original system root in the client configuration file 38. These directories are shown in FIG. 6 below the client configuration file 38, where <Root> is used to represent the original system root from the client configuration file 38.

Figure 7:
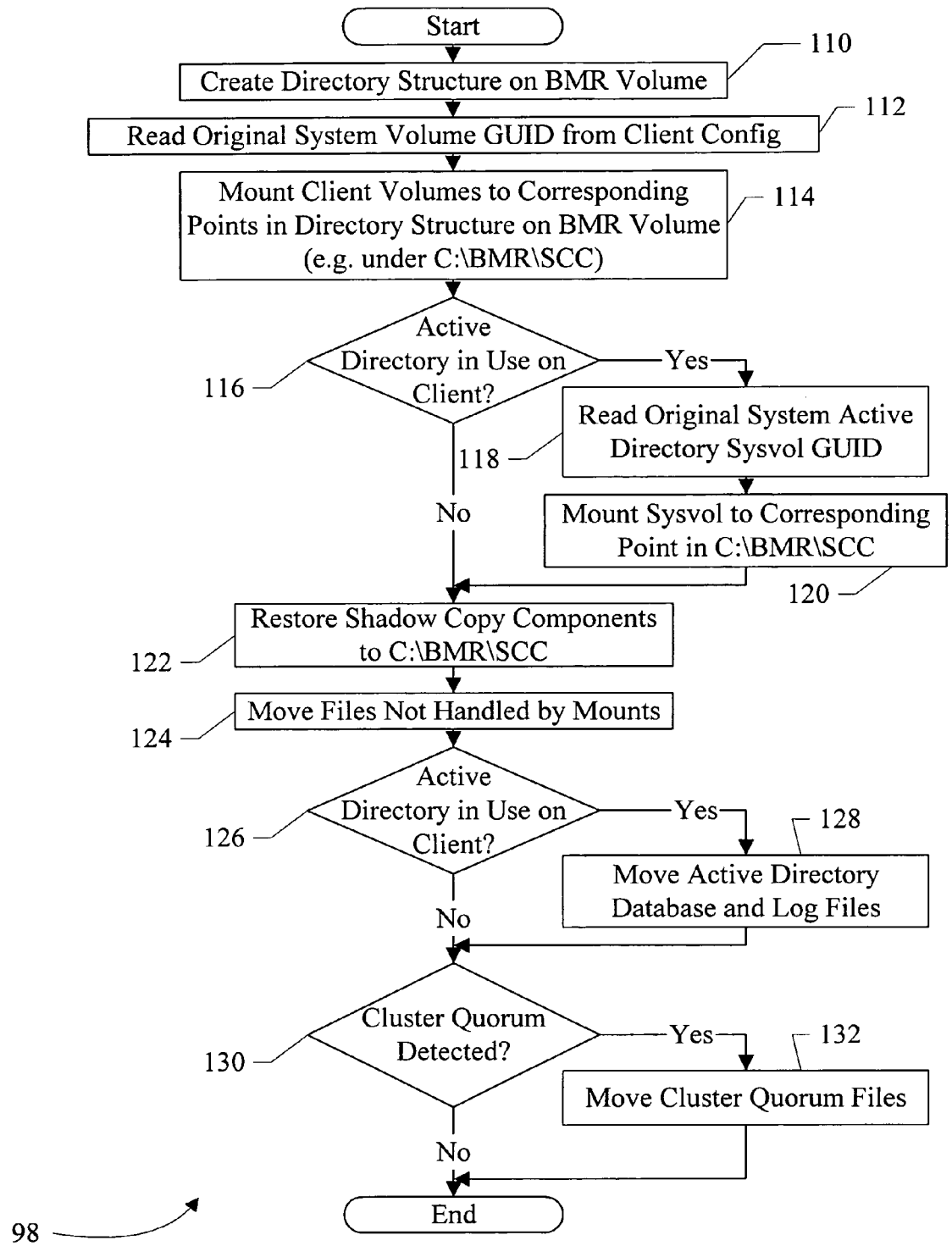
FIG. 7 is a flowchart illustrating one embodiment of restoring volume shadow copy components.

Turning now to FIG. 7, a flowchart is shown illustrating a portion of one embodiment of block 98 shown in FIG. 5. Particularly, the portion illustrated in FIG. 7 may be one embodiment of the portion that handles restoring the redirected shadow copy component files 44 from the backup image 28. The BMR restore program 76 may include instructions which, when executed, implement the operation shown in FIG. 7.

The BMR restore program 76 may create a directory structure on the BMR volumes 80 for the redirected shadow copy components (block 110). The directory structure may include a high level directory name assigned by the BMR restore program 76 (e.g. \BMR\SCC is used in one example). Additional directories in the directory structure may be determined from the shadow copy components included in the redirected shadow copy components files 44 and from the pathname information retained in the backup image 28, for those files for which the pathname is retained. Particularly, a directory for each redirected shadow copy component may be created as a subdirectory of \BMR\SCC. For those redirected shadow copy components for which pathname information is retained, a subdirectory is created for the drive letter portion of the pathname in addition to the various directories in the original directory path.

The BMR restore program 76 may read the original system volume GUID from the client configuration file 38 (block 112) and may use the GUID for mounting the client volumes to corresponding points in the directory structure on the BMR volumes 80 (block 114). Specifically, the drive letter directories may be mount points for the client volumes. Other directories may also be mount points for client volumes as well, in some embodiments. In one example, the event logs, the WMI files, the system files, the IIS files, and the Active Directory® sysvol files may be restored using mount points into the directory structure on the BMR volumes 80. If Active Directory® is in use in the client (decision block 116, "yes" leg), the Active Directory® sysvol is a separate volume (one of the client volumes 34). The BMR restore program 76 may read the Active Directory® sysvol GUID from the client configuration file 38 (block 118) and may mount the sysvol volume to the corresponding point in the directory structure (block 120). In other embodiments, the GUIDs corresponding to the recreated volumes may differ from the original GUIDs stored in the client configuration file 38. In such embodiments, the new GUIDs corresponding to the recreated volumes may be used to mount the recreated volumes.

Once the mounts have been performed, the BMR restore program 76 may restore the shadow copy components to the directory structure (block 122). As the restore occurs, the files stored into subdirectories of the mounted directories (or into the mounted directories) are automatically restored to the corresponding directories on the client volumes 34 through the mounts. The files stored in unmounted directory trees are restored onto the BMR volumes 80. The BMR restore program 76 may move the files not restored through the mounts to the correct locations on the client volumes 34 (block 124). For example, the COM+ registration database and the registry files may be moved. If Active Directory® is in use on the client (decision block 126, "yes" leg), the Active Directory® database and logs may be moved as well (block 128). If a Cluster Quorum is detected (decision block 130, "yes" leg), the cluster quorum files and cluster database may be moved as well (block 132).

As mentioned previously, in other embodiments, the restore environment 74 may share volumes with the client environment 82. Mounts of the shared volume into the directory structure within the restore environment 74 may still be used in such embodiments, even though the directory structure is itself on the shared volume.

Turning now to FIG. 8, an example of the directory structure on the BMR volumes 80 (or the shared volume(s) with the client environment 82) is shown. In this example, the drive letter assigned to the BMR volume on which the directory structure is created is C. Other examples may use other drive letters. In this example, the directory structure starts with a temporary directory created by the BMR restore program 76 (\BMR\SCC). Subdirectories underneath this directory are illustrated in FIG. 8. Hierarchical directories are illustrated by indentation. Thus, Event Logs\ is a subdirectory of \BMR\SCC, and has a C\ subdirectory, which has a WINDOWS\ subdirectory, etc. Mount points are illustrated in FIG. 8, enclosed by "<" and ">" symbols. Thus, the C\ directories under Event Logs\, System Files\, Windows Management Instrumentation\, and Internet Information Services\ are mount points. In this example, C is the drive letter in the original client configuration assigned to the volume to which the event logs, system files, WMI files, and IIS files are to be restored. Other drive letters may be used in other embodiments. It is noted that the same volume may be mounted to each of the C\ directories, since the same underlying volume may be used for the files in those directories. In other examples, the drive letters for one or more of the above shadow copy components may differ.

The Active Directory® sysvol is also shown with a drive letter directory of D\. This directory may be the mount point for the Active Directory® sysvol volume. It is noted that, while the directory structure below the drive letter directory from the event logs, WMI files, system files, and IIS files is fairly standard (although Windows or WINNT may be used depending on the version of Windows® being used), the directory that the active directory sysvol files go to may vary more frequently. Any of the directory structures may be varied in other examples, however.

Also shown in the example of FIG. 8 are the COM+ Class Registration Database\, Registry\, and Cluster\ directories corresponding to the COM+ class registration database, the registry, and the cluster database files. These directories do not have mount points, and thus the files may be restored to the BMR volume and moved by the BMR restore program 76 after the restore.

It is noted that, while the BMR restore program 76 is described herein as performing various functions. While the BMR restore program 76 is implemented in a bare metal restore process, other embodiments may include a restore program that operates in different types of restores. Generally, a restore program may refer to a program that is configured to perform a restore of a backup state to a computer system. Any restore program may implement mounts and file movement to handle restores of shadow copy component files.

It is noted that various operations described as being implemented in software (i.e. programs, instructions to be executed, etc.) above may also be implemented in hardware, or as a combination of hardware and software, in various other embodiments. Each program, software, etc. may be viewed as a module that comprises any combination of software and/or hardware that implements the corresponding function.

Figure 9:
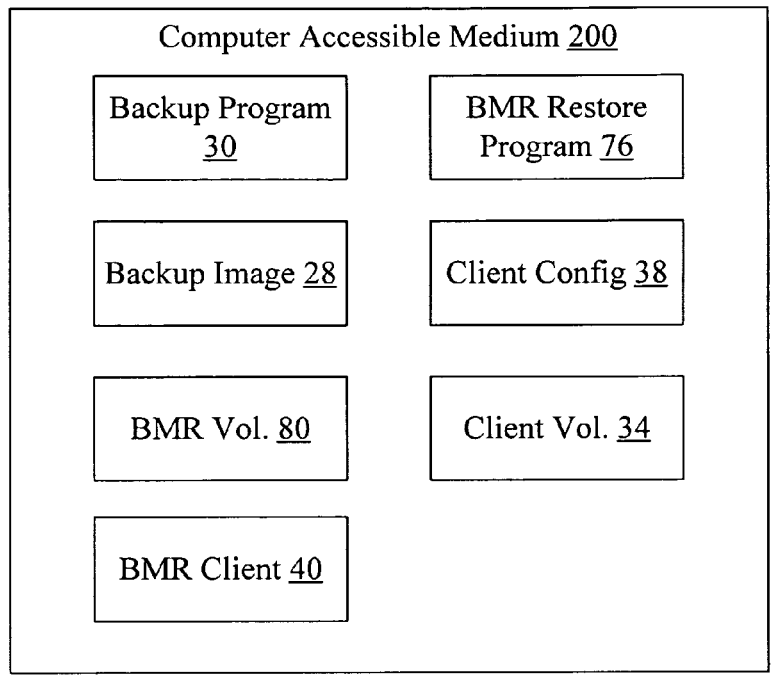
FIG. 9 is a block diagram of one embodiment of a computer accessible medium.

Turning now to FIG. 9, a block diagram of a computer accessible storage medium 200 is shown. Generally speaking, a computer accessible storage medium includes any storage media accessible by a computer during use to provide instructions and/or data to the computer. For example, a computer accessible storage medium includes storage media such as magnetic or optical storage media, e.g., disk (fixed or removable), CD-ROM, or DVD-ROM, CD-R, CD-RW, DVD-R, DVD-RW, volatile or non-volatile memory such as RAM (e.g. synchronous dynamic RAM (SDRAM), Rambus DRAM (RDRAM), static RAM (SRAM), ROM, Flash memory, non-volatile memory (e.g. Flash memory)) accessible via a peripheral interface such as the Universal Serial Bus (USB) interface, etc., microelectromechanical systems (MEMS). A transmission media includes signals such as electrical, electromagnetic, or digital signals, conveyed via a communication medium such as a network and/or a wireless link. The computer accessible storage medium 200 in FIG. 9 may store one or more of the backup program 30, the BMR restore program 76, the BMR client 40, the backup image 28, the client configuration file 38, the BMR volumes 80, and/or the client volumes 34. The backup program 30 and the BMR restore program 76 may comprise instructions which, when executed, implement the operation described herein for the respective software. Generally, the computer accessible storage medium 200 may store any set of instructions which, when executed, implement a portion or all of the flowcharts shown in one or more of FIGS. 3, 5, and 7.

Figure 10:
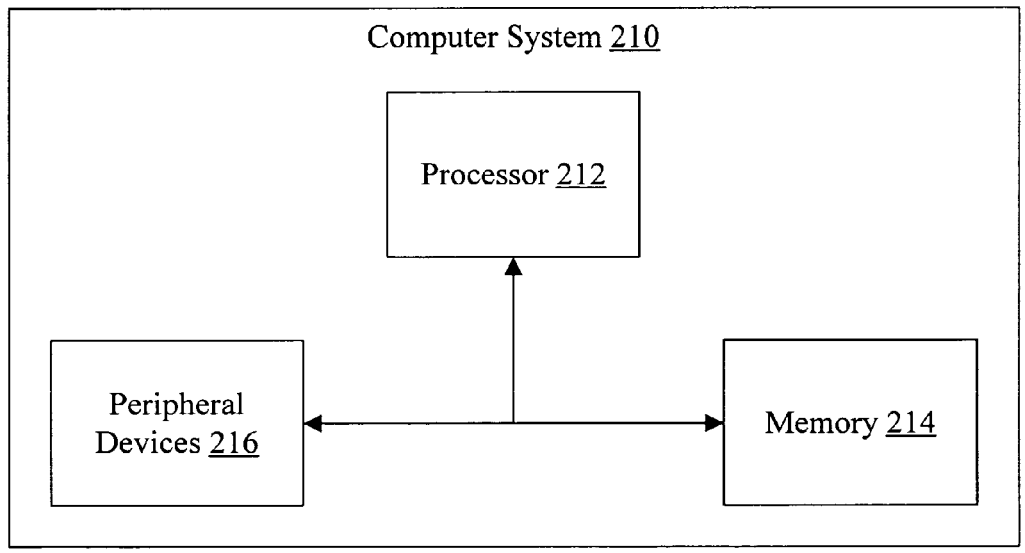
FIG. 10 is a block diagram of one embodiment of a computer system.

FIG. 10 is a block diagram of one embodiment of an exemplary computer system 210. In the embodiment of FIG. 10, the computer system 210 includes a processor 212, a memory 214, and various peripheral devices 216. The processor 212 is coupled to the memory 214 and the peripheral devices 216.

The processor 212 is configured to execute instructions, including the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to couple the processor 212, the memory 214, and the peripheral devices 216, creating multiple connections between these components The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use (including the instructions implementing the software described herein), data to be operated upon by the processor 212 during use, etc.

Peripheral devices 216 may represent any sort of hardware devices that may be included in the computer system 210 or coupled thereto (e.g. storage devices, optionally including a computer accessible medium 200, other input/output (I/O) devices such as video hardware, audio hardware, user interface devices, networking hardware, etc.). In some embodiments, multiple computer systems may be used in a cluster.

In some embodiments, the original client system 24 and/or the restore system 70 may be implemented as instantiations of the computer system 210. Additionally, the computer system 210 may serve as the computer system 210 on which one or more of the BMR server 20, the backup server 22, and/or the file server 72 execute.

Numerous variations and modifications will become apparent to those skilled in the art once the above disclosure is fully appreciated. It is intended that the following claims be interpreted to embrace all such variations and modifications.

What is claimed is:

1. A computer-implemented method for restoring files, the method comprising:
    creating, using a computer, a directory structure on a temporary restore volume on a computer system to which a backup image corresponding to a client is to be restored, wherein the temporary restore volume includes an operating system on which a restore program is executed;
    storing a client configuration file corresponding to the client;
    creating at least one client volume on the computer system, wherein the client volume is used for storage by the client and the client volume identified in the client configuration file;
    mounting the client volume to a directory in the directory structure on the temporary restore volume;
    restoring a plurality of files from the backup image to the directory structure on the temporary restore volume, wherein at least a first file of the plurality of files is restored to the client volume by transferring the first file from the backup image through the directory to which the client volume is mounted and onto the client volume, and wherein the plurality of files are created by an operating system service during a backup operation that created the backup image, wherein the operating system service is defined to create shadow copies of files that are open during the backup operation;
    moving at least a second file of the plurality of files to the client volume subsequent to restoring the second file to the directory structure, the second file not restored to the client volume through the directory in the directory structure to which the client volume is mounted; and
    removing the temporary restore volume subsequent to the restoring the plurality of files.

2. The method as recited in claim 1 wherein a name of the directory comprises a drive letter assigned to the client volume in the client.

3. The method as recited in claim 1 wherein the backup image further comprises a second plurality of files, the method further comprising restoring the second plurality of files directly to the client volume.

4. The method as recited in claim 1 wherein the creating the at least one client volume comprises creating a plurality of volumes including the client volume, and wherein the method further comprises mounting one or more of the plurality of volumes in addition to mounting the client volume, each of the one or more volumes mounted to a different directory in the directory structure.

5. A computer implemented method comprising:
    creating, using a computer, a directory structure on a computer system to which a backup image corresponding to a client is to be restored;
    creating at least one client volume on the computer system, wherein the client volume is used for storage by the client, wherein the client volume has a second directory structure;
    mounting the client volume to a directory in the directory structure;
    restoring a plurality of files from the backup image to the directory structure, wherein at least a first file of the plurality of files is restored to the client volume by transferring the first file from the backup image through the directory to which the client volume is mounted and onto the client volume, and wherein the plurality of files are created by an operating system service during a backup operation that created the backup image, wherein the operating system service is defined to create shadow copies of files that are open during the backup operation;
    moving at least a second file of the plurality of files to the client volume subsequent to restoring the second file to the directory structure, the second file not restored to the client volume through the directory in the directory structure to which the client volume is mounted; and
    determining at least a portion of a directory in the second directory structure to which the second file is restored responsive to a client configuration file corresponding to the client, the client configuration file created during the backup operation of the client.

6. The method as recited in claim 5 wherein the backup image further comprises a second plurality of files, the method further comprising restoring the second plurality of files directly to the client volume.

7. A computer accessible storage medium storing a plurality of instructions, which is executed on a restore system, implement a method comprising:
    creating a directory structure on a temporary restore volume on a computer system to which a backup image corresponding to a client is to be restored, wherein the temporary restore volume includes an operating system on which a restore program is executed;
    storing a client configuration file corresponding to the client;

creating at least one client volume on the computer system, wherein the client volume is used for storage by the client and the client volume identified in the client configuration file;

mounting the client volume to a directory in the directory structure on the temporary restore volume;

restoring a plurality of files from the backup image to the directory structure on the temporary restore volume, wherein at least a first file of the plurality of files is restored to the client volume by transferring the first file from the backup image through the directory to which the client volume is mounted and onto the client volume, and wherein the plurality of files are created by an operating system service during a backup operation that created the backup image, wherein the operating system service is defined to create shadow copies of files that are open during the backup operation;

moving at least a second file of the plurality of files to the client volume subsequent to restoring the second file to the directory structure, the second file not restored to the client volume through the directory in the directory structure to which the client volume is mounted; and removing the temporary restore volume subsequent to the restoring the plurality of files.

8. The computer accessible storage medium as recited in claim 7 wherein a name of the directory comprises a drive letter assigned to the client volume in the client.

9. The computer accessible storage medium as recited in claim 7, wherein the client volume has a second directory structure, and wherein the method further comprises determining at least a portion of a directory in the second directory structure to which the second file is restored responsive to the client configuration file corresponding to the client, the client configuration file created during a backup operation of the client.

10. The computer accessible storage medium as recited in claim 7 wherein the backup image further comprises a second plurality of files, the method further comprising restoring the second plurality of files directly to the client volume.

11. The computer accessible storage medium as recited in claim 7 wherein the creating at least one client volume comprises creating a plurality of volumes including the client volume, and wherein the method further comprises mounting one or more of the plurality of volumes in addition to mounting the client volume, each of the one or more volumes mounted to a different directory in the directory structure.

12. A system for restoring files comprising:
a computer accessible storage medium; a processor;
a backup server that stores a backup image corresponding to a client;
a restore server that stores a client configuration file corresponding to the client;
a restore system to which the client is to be restored, the restore system coupled to the backup server and the restore server, wherein a restore module on the restore system to:

create a directory structure on a temporary restore volume on the restore system, wherein the temporary restore volume includes an operating system on which a restore program is executed;

create at least one client volume on the restore system, wherein the client volume used by the client for storage and the client volume identified in the client configuration file;

mount the client volume to a directory in the directory structure on the temporary restore volume;

restore a plurality of files from the backup image to the directory structure on the temporary restore volume, wherein at least a first file of the plurality of files is restored to the client volume by transferring the first file from the backup image through the directory to which the client volume is mounted and onto the client volume, and wherein the plurality of files are created by an operating system service during a backup operation that created the backup image, wherein the operating system service is defined to create shadow copies of files that are open during the backup operation;

move at least a second file of the plurality of files to the client volume subsequent to restoring the second file to the directory structure, the second file not restored to the client volume through the directory in the directory structure to which the client volume is mounted; and removing the temporary restore volume subsequent to the restoring the plurality of files.

13. The system as recited in claim 12 wherein a name of the directory comprises a drive letter assigned to the client volume in the client.

14. The system as recited in claim 12, wherein the client volume has a second directory structure, and wherein the restore module further determines at least a portion of a directory in the second directory structure to which the second file is restored responsive to the client configuration file.

15. The system as recited in claim 12 wherein the backup image further comprises a second plurality of files, the restore module further configured to restore the second plurality of files directly to the client volume.

16. The system as recited in claim 12 wherein creating at least one client volume comprises creating a plurality of volumes including the client volume, and wherein the restore module is further configured to mount one or more of the plurality of volumes in addition to mounting the client volume, each of the one or more volumes mounted to a different directory in the directory structure.

* * * * *